United States Patent
Chou et al.

(10) Patent No.: US 11,763,677 B2
(45) Date of Patent: Sep. 19, 2023

(54) DYNAMICALLY IDENTIFYING A DANGER ZONE FOR A PREDICTED TRAFFIC ACCIDENT

(71) Applicant: INTERNATIONAL BUSINESS MACHINES CORPORATION, Armonk, NY (US)

(72) Inventors: Kuo-Liang Chou, New Taipei (TW); Min Luo, Beijing (CN); Der-Joung Wang, New Taipei (TW); Xiang Yu Yang, Shaanxi (CN); Ci-Wei Lan, Keelung (TW)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 17/247,170

(22) Filed: Dec. 2, 2020

(65) Prior Publication Data
US 2022/0172625 A1     Jun. 2, 2022

(51) Int. Cl.
*G08G 1/16* (2006.01)
*G08G 1/00* (2006.01)
(Continued)

(52) U.S. Cl.
CPC .............. *G08G 1/164* (2013.01); *G06N 3/045* (2023.01); *G06N 3/08* (2013.01); *G08G 1/052* (2013.01); *G08G 1/166* (2013.01); *G08G 1/20* (2013.01)

(58) Field of Classification Search
CPC ........ G08G 1/164; G08G 1/052; G08G 1/166; G08G 1/20; G08G 1/005; G08G 1/0116;
(Continued)

(56) References Cited

U.S. PATENT DOCUMENTS

| 8,533,746 B2 | 9/2013 | Nolan |
| 8,843,941 B2 | 9/2014 | Moore |

(Continued)

FOREIGN PATENT DOCUMENTS

| CN | 201425781 Y | 3/2010 |
| WO | 2012173372 A2 | 12/2012 |
| WO | 2012173372 W | 12/2012 |

OTHER PUBLICATIONS

Deep Learning vs. Machine Learning—the essential differences you need to know! (Year: 2017).*

(Continued)

*Primary Examiner* — Fadey S. Jabr
*Assistant Examiner* — Faris Asim Shaikh
(74) *Attorney, Agent, or Firm* — Schmeiser, Olsen & Watts, LLP; Edward Wixted

(57) ABSTRACT

An approach is provided for dynamically identifying a danger zone for a predicted traffic accident and generating a warning about the accident. From a monitoring device at a first location, information about traffic conditions for vehicles at time $T_0$ and at least one subsequent time $T_0+t$ is received. Based on speeds of the vehicles and a fixed distance from the first location, a response time is calculated. Within the response time, a dual artificial intelligence (AI) model using shallow and deep learners applied on historical accident data is employed. Based on the dual AI model and the traffic conditions, an accident involving vehicle(s) in the traffic is predicted to occur in a zone. A warning about the accident is generated and sent to device(s) in the vehicle(s). The warning is presented to driver(s) of the vehicle(s).

16 Claims, 4 Drawing Sheets

(51) Int. Cl.
*G08G 1/052* (2006.01)
*G06N 3/08* (2023.01)
*G06N 3/045* (2023.01)

(58) Field of Classification Search
CPC .............. G08G 1/0129; G08G 1/0145; G08G 1/096716; G08G 1/096741; G08G 1/096775; G08G 1/017; G06N 3/0454; G06N 3/08; G06N 20/00
See application file for complete search history.

(56) References Cited

U.S. PATENT DOCUMENTS

| | | | |
|---|---|---|---|
| 9,412,271 | B2 | 8/2016 | Sharma |
| 9,443,152 | B2* | 9/2016 | Atsmon ............... G08G 1/0112 |
| 9,607,402 | B1* | 3/2017 | Whiting ................ G08G 1/005 |
| 9,916,420 | B2 | 3/2018 | Cardoza |
| 10,994,727 | B1* | 5/2021 | Kumar ............... G06Q 30/0213 |
| 11,328,505 | B2* | 5/2022 | Taccari ................ G06V 10/806 |
| 11,475,527 | B1* | 10/2022 | Leise .................... G06N 20/00 |
| 2005/0073438 | A1* | 4/2005 | Rodgers ................ G08G 1/161 |
| | | | 340/944 |
| 2010/0023216 | A1* | 1/2010 | Huang .................. B62D 6/007 |
| | | | 701/42 |
| 2013/0204515 | A1* | 8/2013 | Emura .................. G08G 1/052 |
| | | | 701/119 |
| 2016/0061625 | A1* | 3/2016 | Wang ................. G01C 21/3697 |
| | | | 701/454 |
| 2017/0206319 | A1 | 7/2017 | Attanapola et al. |
| 2019/0130739 | A1* | 5/2019 | Khedkar .............. G08G 1/0965 |
| 2019/0171208 | A1* | 6/2019 | Magalhães de Matos ................. |
| | | | G05D 1/0027 |
| 2020/0148200 | A1* | 5/2020 | Lerner .................. B60W 50/14 |
| 2022/0044556 | A1* | 2/2022 | Luo ...................... G08G 1/0116 |
| 2022/0169282 | A1* | 6/2022 | Gan ...................... G07C 5/0808 |
| 2022/0297644 | A1* | 9/2022 | Rho ....................... G06V 40/16 |
| 2022/0405857 | A1* | 12/2022 | Leise ..................... G06N 20/00 |

OTHER PUBLICATIONS

Vehicle Accident Risk Prediction Based on AdaBoost—SO in VANETs (Year: 2019).*
Looking at Intersections: A Survey of Intersection Monitoring, Behavior and Safety Analysis of Recent Studies (Year: 2016).*
Hourdos, John et al.; Accident Prevention Based on Automatic Detection of Accident Prone Traffic Conditions: Phase I; ITS Institute; Sep. 2008; 169 pages.
Park, Soyoung et al.; Real-Time Traffic Risk Detection Model Using Smart Mobile Device; NCBI; Oct. 30, 2018; 21 pages.
McDonald, Carol; How Big Data is Reducing Costs and Improving Outcomes in Health Care; https://mapr.com/blog/reduce-costs-and-improve-health-care-with-big-data/; retrieved from the Internet Oct. 15, 2019; 20 pages.
Using the Automatic API Updater; https://docs.unity3d.com/Manual/APIUpdater.html; retrieved from the Internet Oct. 17, 2019; 5 pages.

* cited by examiner

DYNAMICALLY IDENTIFYING A DANGER ZONE FOR A PREDICTED TRAFFIC ACCIDENT

BACKGROUND

The present invention relates to vehicular traffic management, and more particularly to identifying a danger zone and generating a real-time warning about a traffic accident predicted to occur in the danger zone.

With all kinds of vehicles on roadways and with the advance of motor-driven or electricity-driven transportation, managing traffic has become more complicated. Existing traffic safety technologies avoid traffic accidents by relying on a driver's reaction or vehicle component intervention.

SUMMARY

In one embodiment, the present invention provides a computer-implemented method. The method includes receiving, by one or more processors and from a monitoring device, information about conditions of traffic at a time $T_0$ and at least one subsequent time $T_0+t$. The monitoring device is at a first location and the traffic includes multiple vehicles. The method further includes based on speeds of the vehicles included in the received information about the conditions of the traffic and based on a fixed distance from the first location, calculating, by the one or more processors, a response time $RT_0$. The method further includes within the response time $RT_0$, employing, by the one or more processors, a dual artificial intelligence (AI) model that uses a shallow learner and a deep learner applied on historical data about past traffic accidents. The method further includes based on the employed dual AI model and the received conditions of the traffic, predicting, by the one or more processors, that an accident is likely to occur in a zone towards which the traffic is moving. The accident involves one or more vehicles included in the multiple vehicles. The one or more vehicles have respective one or more drivers. The accident is predicted prior to the one or more vehicles traveling into the zone. The method further includes generating, by the one or more processors, a warning about the accident likely to occur in the zone. The method further includes sending, by the one or more processors, the warning to one or more devices in the one or more vehicles, where the sending includes presenting the warning to the one or more drivers.

A computer program product and a computer system corresponding to the above-summarized method are also described and claimed herein.

DETAILED DESCRIPTION

Overview

An existing traffic safety approach of relying on a driver's reaction or vehicle component intervention is a vehicle-centered and/or last second design, which often does not provide sufficient time to allow nearby passengers, vehicles, and/or pedestrians to avoid a potential danger caused by one or more vehicles.

Embodiments of the present invention address the aforementioned unique challenges by providing a danger zone identification and warning system, which allows drivers of vehicles, passengers in the vehicles, and pedestrians to be aware of dangerous traffic-related conditions that are likely to happen and provide them with enough time to take actions to avoid or minimize the dangerous conditions and increase a likelihood that they remain safe. Based on dynamic vehicle traffic conditions, one or more embodiments provide a real-time identification of a danger zone which specifies a geographic area in which a potential danger (i.e., a collision involving a vehicle moving in traffic or another accident involving a moving vehicle) is likely to occur. One or more embodiments generate and present a warning of the potential danger to all subjects within or near the identified danger zone, thereby allowing drivers of vehicles, passengers, and/or pedestrians to take actions to avoid the danger or decrease the negative effects of the danger.

Figure 1:
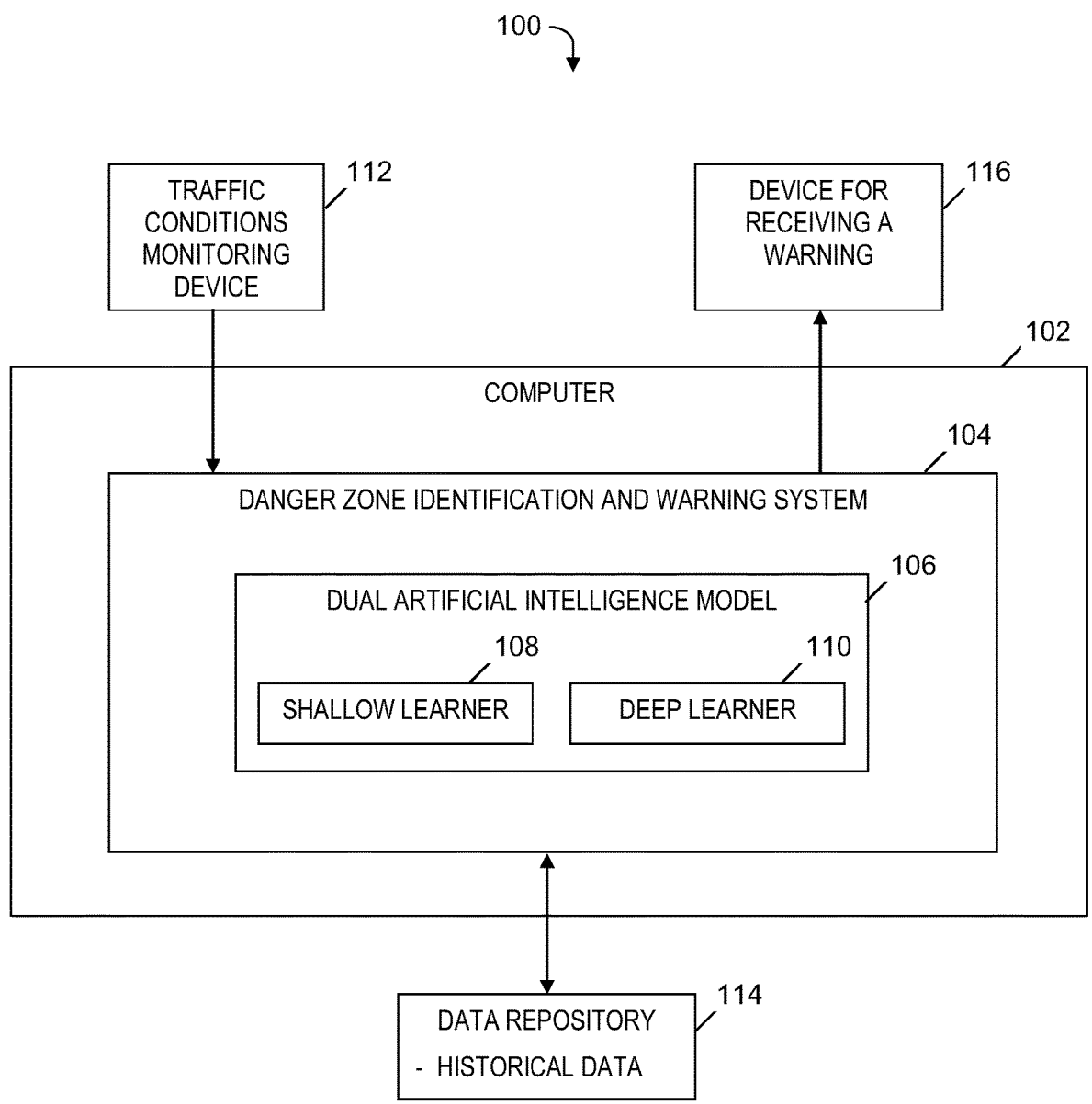
FIG. 1 is a block diagram of a system for dynamically identifying a danger zone for a predicted traffic accident and sending a warning, in accordance with embodiments of the present invention.

System for Dynamically Identifying a Danger Zone for a Predicted Traffic Accident FIG. 1 is a block diagram of a system 100 for dynamically identifying a danger zone for a predicted traffic accident and sending a warning, in accordance with embodiments of the present invention. System 100 includes a computer 102, which executes a software-based danger zone identification and warning system 104, which includes a dual artificial intelligence (AI) model 106, which includes a shallow learner 108 and a deep learner 110. Dual AI model 106 supports a real-time danger determination (i.e., a determination of a danger associated with a predicted traffic accident). In one embodiment, shallow learner 108 employs efficient shallow machine learning methods. In one embodiment, shallow learner 108 employs a decision tree or a support-vector machine (SVM). In one embodiment, deep learner 110 employs a long short-term memory (LSTM) or gated recurrent units (GRU).

In one embodiment, dual AI model 106 employs deep learner 110 as a priority over shallow learner 108 and uses shallow learner 108 as a backup to deep learner 110.

Danger zone identification and warning system 104 receives data specifying snapshots of traffic conditions from a traffic conditions monitoring device 112. The traffic conditions snapshots are snapshots at an initial time $T_0$ and at subsequent, regular intervals after $T_0$. In one embodiment, the regular intervals after $T_0$ include the times $T_0+t$, $T_0+2t$, $T_0+3t$, etc. Danger zone identification and warning system 104 receives general vehicle information at time $T_0$, and receives vehicle dynamics information and inter-vehicle dynamics information at subsequent times at the aforementioned intervals, such as $T_0+t$.

In one embodiment, traffic conditions monitoring device 112 includes a camera configured to capture video images of traffic and send the images to danger zone identification and warning system 104. In one embodiment, traffic conditions monitoring device 112 receives information transmitted as a wireless signal from an Internet of Things (IoT) device in one or more vehicles. Traffic conditions monitoring device 112 sends the images captured by the camera and information received from IoT devices to danger zone identification and warning system 104, which analyzes the images and the information from the IoT devices to determine general vehicle information, vehicle dynamics information, and inter vehicle dynamics information. In one embodiment, the general vehicle information includes (i) a vehicle type, (ii) vehicle age, (iii) vehicle power, (iv) vehicle insurance co-efficient, (v) vehicle color, (vi) vehicle lock status, and (vii) vehicle warning status. In one embodiment, the vehicle dynamics information includes (i) an amount of time elapsed from a time the engine of the vehicle was last started, (ii) an average speed of the vehicle in the last X minutes, where X is a specified, configurable number of minutes, (iii) an average speed of the vehicle between times $T_0$ and $T_0+t$, and (iv) a difference in the speeds of the vehicle at times $T_0$ and $T_0+t$. In one embodiment, the inter-vehicle dynamics information includes a number of vehicles in a specified, fixed area and an occurrence of a lane change by a vehicle since time $T_0$.

Danger zone identification and warning system 104 is operatively coupled to a data repository 114 and retrieves historical data from data repository 114. The historical data stored in data repository 114 specifies past traffic accidents. At time $T_0+t$, danger zone identification and warning system 104 calculates a response time $RT_0$ against (i) a fixed distance and (ii) a greatest speed included in the speeds of the vehicles in the traffic whose conditions are being monitored by traffic conditions monitoring device 112. Danger zone identification and warning system 104 determines the speeds of the vehicles from the traffic conditions received from traffic conditions monitoring device 112. Within the response time $RT_0$, dual AI model 106 determines if the traffic conditions at time $T_0+t$ would likely cause an accident based on dual AI model 106 learning from past traffic accidents specified in the historical data retrieved from data repository 114.

Danger zone identification and warning system 104 classifies a potential danger (i.e., determines that a traffic accident is likely to happen at a probability that exceeds a threshold probability), determines a danger zone in which the accident is likely to happen, and generates and sends a warning to a device 116 for receiving a warning. In one embodiment, device 116 is in or on a vehicle in the traffic that is moving toward or within the danger zone. Device 116 may be a mobile device in the possession of or operated by the driver of a vehicle or by a passenger in the vehicle. In one embodiment, device 116 is on an object in or near the danger zone (e.g., a device which is a built-in component of a street lamp or a device mounted on a street lamp), and device 116 transmits the received warning to device(s) in vehicle(s) within or near the danger zone and/or to mobile device(s) in the possession of or operated by pedestrians(s) within or near the danger zone.

Alternatively, system 100 includes multiple devices that have the same functionality as device 116, where a first one or more of the devices are in vehicle(s) in or near the danger zone and present the warning to driver(s) or passenger(s) in the vehicle(s), a second one or more of the devices are mobile device(s) in the possession of or operated by pedestrian(s) in or near the danger zone, and a third one or more of the devices are in or on object(s) (e.g., a street lamp) that are in or near the danger zone. The device(s) on the object(s) are configured to receive a transmission of the warning and re-transmit the warning to a device so that the warning is displayed or otherwise presented to a driver, passenger, or pedestrian.

The aforementioned presentation of the warning to a driver, passenger, or pedestrian can be in a format that is sensible depending on the context of the predicted accident or the type of the predicted accident, where the format can be an audio, visual, and/or tactile format.

Figure 2:
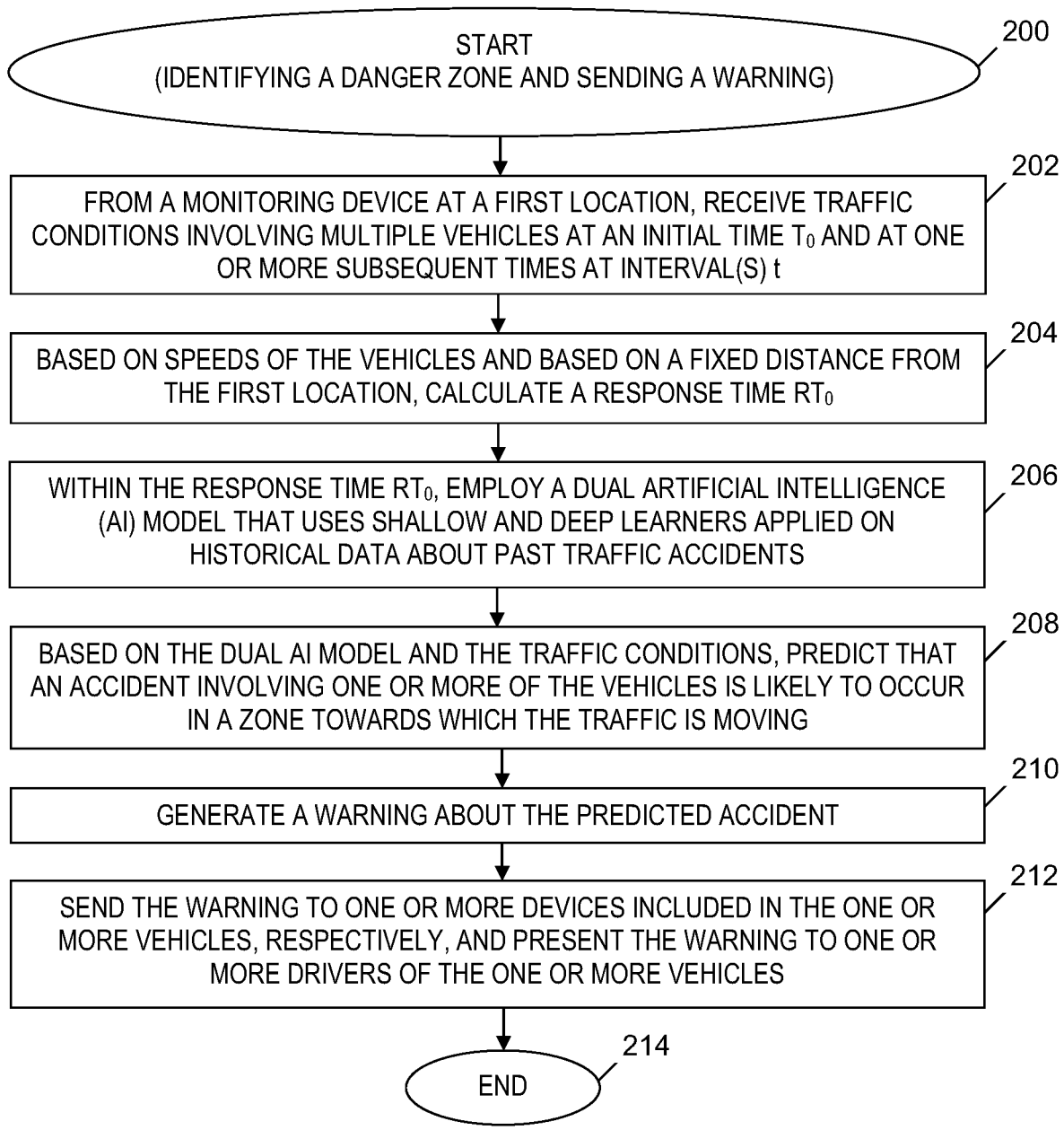
FIG. 2 is a flowchart of a process of dynamically identifying a danger zone for a predicted traffic accident and sending a warning, where the process is implemented in the system of FIG. 1, in accordance with embodiments of the present invention.
Figure 3:
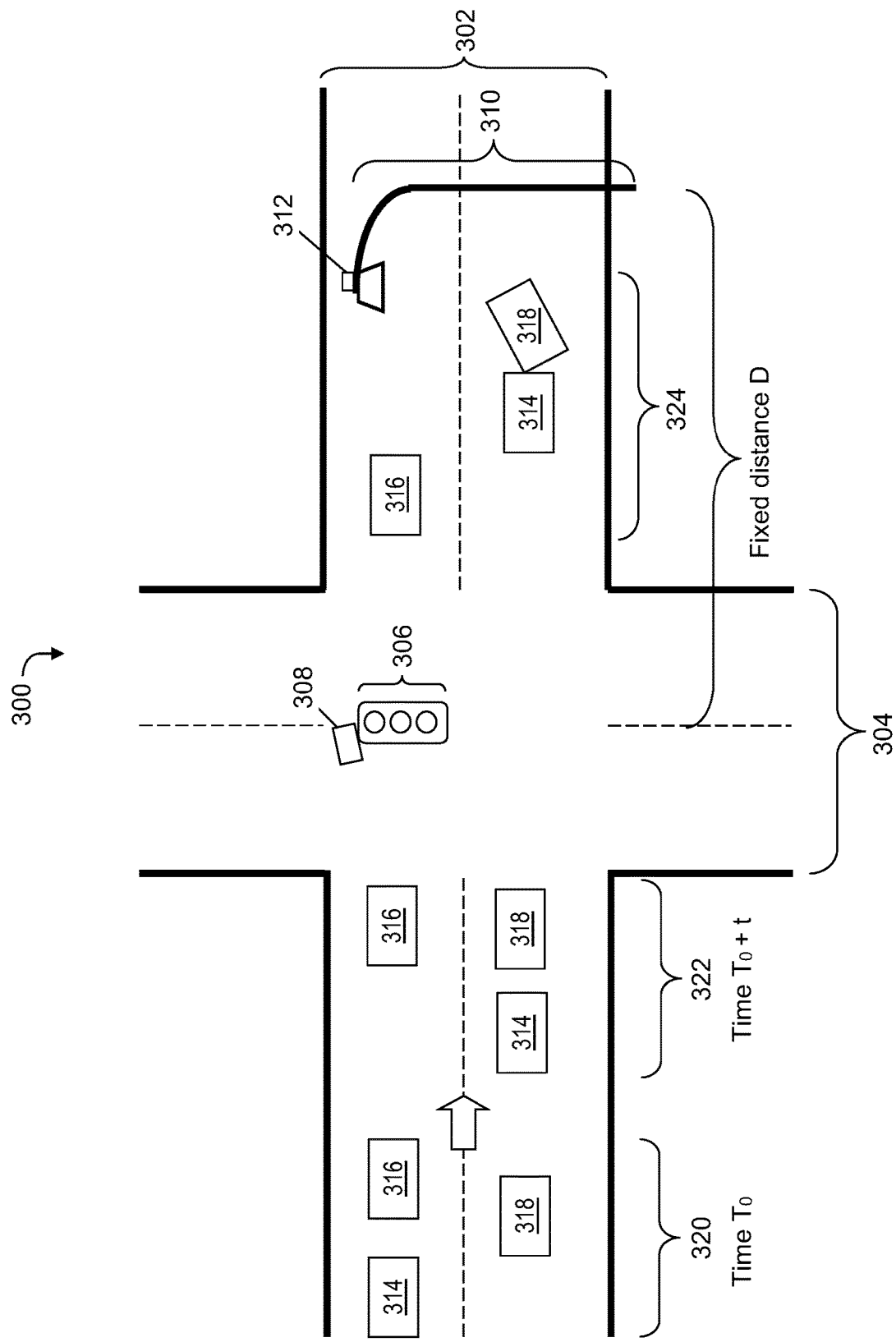
FIG. 3 is an example of identifying a danger zone and sending a warning using the process in FIG. 2, in accordance with embodiments of the present invention.
Figure 4:
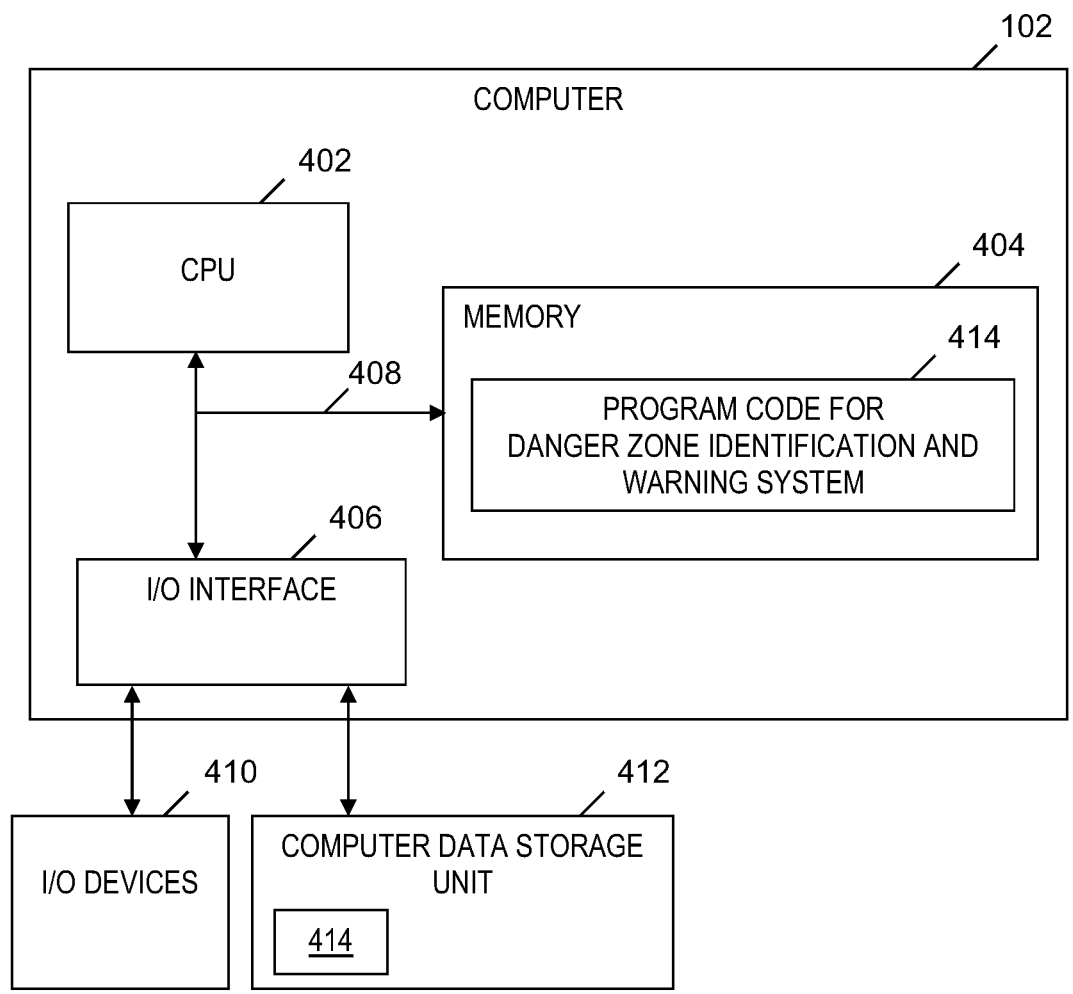
FIG. 4 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 4 presented below.

Process for Dynamically Identifying a Traffic Danger Zone for a Predicted Traffic Accident FIG. 2 is a flowchart of a process of dynamically identifying a danger zone for a predicted traffic accident and sending a warning, where the process is implemented in system 100 in FIG. 1, in accordance with embodiments of the present invention. The process of FIG. 2 begins at a start node 200. In step 202, danger zone identification and warning system 104 (see FIG. 1) receives conditions of traffic that includes a plurality of vehicles at an initial time $T_0$ and at one or more subsequent times at interval(s) of an amount of time t. In step 202, danger zone identification and warning system 104 (see FIG. 1) receives the aforementioned conditions of the traffic from traffic conditions monitoring device 112 (see FIG. 1).

In step 204, based on (i) speeds of the vehicles included in the traffic whose conditions are received in step 202 and (ii) a fixed distance D from the location of the traffic conditions monitoring device 112 (see FIG. 1), danger zone identification and warning system 104 (see FIG. 1) calculates a response time $RT_0$.

In step 206, within the response time $RT_0$ following time $T_0$, danger zone identification and warning system 104 (see FIG. 1) employs dual AI model 106 (see FIG. 1) that uses shallow learner 108 (see FIG. 1) or deep learner 110 (see FIG. 1) applied on historical data about past traffic accidents retrieved from data repository 114 (see FIG. 1). In one embodiment, danger zone identification and warning system 104 (see FIG. 1) retrieves the aforementioned historical data from data repository 114 (see FIG. 1) prior to step 206.

In step 208, based on the dual AI model 106 (see FIG. 1) and the traffic conditions received in step 202, danger zone identification and warning system 104 (see FIG. 1) predicts that an accident involving one or more vehicles included in the plurality of vehicles is likely to occur in a zone towards which the traffic is moving. In one embodiment, the zone is defined by a determination of where the one or more vehicles are likely to be within the response time $RT_0$.

In one embodiment, danger zone identification and warning system 104 (see FIG. 1) predicts the vehicle(s) likely to be involved in the predicted accident based on past traffic accident data retrieved from data repository 114 (see FIG. 1) by using data vectorization, data transformation and normalization, and training and testing data.

The aforementioned data vectorization includes danger zone identification and warning system 104 (see FIG. 1) transforming nominal values from the traffic conditions received in step 202 into a vector representation. In one embodiment, the nominal values subject to data vectorization include vehicle type, vehicle color, vehicle lock status, and vehicle warning status. For example, received data indicating a vehicle color is white is represented by a vector v_color=(1, 0, 0, 0, 0, 0), which is aligned with the schema (white, black, silver, red, yellow, brown).

The data transformation and normalization used to make the predication in step 208 includes danger zone identification and warning system 104 (see FIG. 1) transforming numerical values from the received traffic conditions into an identical measurement unit. In one embodiment, the aforementioned numerical values include values for vehicle age, vehicle power, and the vehicle dynamics information. For example, danger zone identification and warning system 104 (see FIG. 1) transforms a numerical value for vehicle age into an age expressed as a number of months. Danger zone identification and warning system 104 (see FIG. 1) employs different normalization methods (e.g., minMax) as needed by the scale of measurement for the data (e.g., ordinal, interval, ratio, etc.).

For training and testing data, danger zone identification and warning system 104 (see FIG. 1) retrieves a pre-defined time interval from the historical data about past traffic accidents stored in data repository 114 (see FIG. 1) and uses the interval to aggregate multiple snapshots of traffic conditions as a record. In one embodiment, the pre-defined time interval is the time t (i.e., the snapshot interval). In one embodiment, danger zone identification and warning system 104 (see FIG. 1) uses the earliest snapshot timestamp to represent the temporal rank, uses a vector as a label with schema acc_label=('death', 'injury', 'vehicle damage', 'minor damage'), and aggregates the snapshots to form $Record_{SS}$=(time of $snapshot_i$, ($snapshot_i$, $snapshot_{i+t}$, $snapshot_{i+2t}$), acc_label).

Based on a pre-defined sampling ratio, danger zone identification and warning system 104 (see FIG. 1) samples a dataset for training and testing. In one embodiment, danger zone identification and warning system 104 (see FIG. 1) uses model validation (e.g., k-fold cross validation) to determine training and testing sets.

In step 210, danger zone identification and warning system 104 (see FIG. 1) generates a warning about the predicted accident.

In step 212, danger zone identification and warning system 104 (see FIG. 1) sends the warning to one or more devices included in the aforementioned one or more vehicles, respectively, and presents the warning to one or more drivers of the one or more vehicles.

Following step 212, the process of FIG. 2 ends at an end node 214.

In one embodiment, if response time $RT_0$ is less than a threshold amount, danger zone identification and warning system 104 (see FIG. 1) employs dual AI model 106 (see FIG. 1) which uses shallow learner 108 (see FIG. 1), but not deep learner 110 (see FIG. 1). Furthermore, if $RT_0$ is greater than or equal to the threshold amount, then danger zone identification and warning system 104 (see FIG. 1) employs dual AI model 106 (see FIG. 1) which uses deep learner 110 (see FIG. 1), but not shallow learner 108 (see FIG. 1). Since the deep learner 110 (see FIG. 1) requires more time than shallow learner 108 (see FIG. 1) to make the prediction in step 208, making the selection to use deep learner 110 (see FIG. 1) instead of shallow learner 108 (see FIG. 1) requires that the response time $RT_0$ be an amount of time sufficient for the deep learner 110 (see FIG. 1) to complete its analysis and prediction in step 208, while leaving enough time to generate and send the warning in steps 210 and 212 and enough time for the subject(s) receiving the warning to avoid the predicted traffic accident or minimize the negative effects of the accident.

In one embodiment, step 208 includes danger zone identification and warning system 104 (see FIG. 1) (i) determining $Record_{ss}$, a record of a snapshot of traffic conditions that are predicted to cause a traffic accident; (ii) using $Record_{ss}$ and an accident prediction model provided by dual AI model 106 (see FIG. 1) to identify vehicles (hereinafter in this paragraph, "the identified vehicles") exhibiting high risk behaviors according to pre-defined rules (e.g., a vehicle changed lanes and is traveling at a speed exceeding a speed limit by a threshold amount); (iii) masking the identified vehicles to form $Record_{ss\_mask}$, which is a record of a snapshot mask that retains only the information associated with the identified vehicles and filters out information associated with other vehicles in the traffic; and (iv) using the accident prediction model to predict whether a traffic accident is predicted based on the snapshot mask and if the traffic accident is predicted, then sending the warning to devices in the identified vehicles in step 212.

Example

FIG. 3 is an example 300 of identifying a danger zone and sending a warning using the process in FIG. 2, in accordance with embodiments of the present invention. Example 300 includes a first street 302 and a second street 304 that form an intersection which includes a traffic light 306. A device 308 that includes a camera is mounted on traffic light 306 and is an example of traffic conditions monitoring device 112 (see FIG. 1).

A street lamp 310 is positioned next to first street 302 and includes a device 312, which is a device for receiving a transmission of a warning from danger zone identification and warning system 104 (see FIG. 1) and is configured to re-transmit the received warning to one or more devices in vehicles and/or in the possession of or operated by pedestrians. Device 312 is an example of device 116 (see FIG. 1).

Device 308 monitors conditions of traffic that includes vehicles 314, 316, and 318 in a first configuration 320 at an initial time $T_0$ (i.e., device 308 monitors a snapshot of traffic conditions at a location on street 302 that is within the field of view of the camera included in device 308). At a subsequent time $T0+t$, device 308 monitors conditions of traffic that includes vehicles 314, 316, and 318 in a second configuration 322. After monitoring traffic conditions at $T_0$ and time $T_0+t$, device 308 sends the traffic conditions to danger zone identification and warning system 104 (see FIG. 1), which determines a vehicle in the monitored traffic that is traveling at the greatest speed and calculates a dynamic response time $RT_0$ against the greatest speed and a fixed distance D between the traffic light 306 and street lamp 310.

Within the calculated response time $RT_0$ following the initial time $T_0$, danger zone identification and warning system 104 (see FIG. 1) employs dual AI model 106 (see FIG. 1) to determine whether the monitored traffic conditions at time $T_0$ and time $T_0+t$ will lead to a traffic accident with a probability that exceeds a threshold probability. In example 300, by using a learning of past traffic accidents whose information is stored in and retrieved from data repository 114 (see FIG. 1), dual AI model 106 (see FIG. 1) predicts a third configuration 324 of vehicles 314, 316, and 318, which indicates a prediction of vehicle 314 causing a traffic accident by colliding with vehicle 318. Dual AI model 106 (see FIG. 1) makes the aforementioned accident prediction based the traffic conditions monitored by device 308 showing that vehicle 314 changes lanes between time $T_0$ and time $T_0+t$ and indicating the speeds of vehicles 314 and 318 at time $T_0+t$.

Danger zone identification and warning system 104 (see FIG. 1) classifies the potential danger of the predicted accident and identifies a danger zone in which the traffic accident is likely to occur. In example 300, the danger zone identification and warning system 104 (see FIG. 1) identifies the danger zone as the area on street 302 between traffic light 306 and street lamp 310. Danger zone identification and warning system 104 (see FIG. 1) identifies high risk vehicles as being vehicles 314, 316, and 318, because vehicles 314, 316, and 318 are predicted to be in the identified danger zone at the time of the predicted accident. Danger zone identification and warning system 104 (see FIG. 1) sends a warning about the predicted accident to devices in the identified high risk vehicles (i.e., sends the warning to devices (not shown) in vehicles 314, 316, and 318). Further, danger zone identification and warning system 104 (see FIG. 1) sends a warning to device 312, which receives the warning and transmits the warning to mobile devices (not shown) that are possessed by pedestrians (not shown) who are near the identified danger zone.

Computer System

FIG. 4 is a block diagram of a computer that is included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for a system that includes danger zone identification and warning system 104 (see FIG. 1) to perform a method of dynamically identifying a danger zone for a predicted traffic accident and sending a warning, where the instructions are executed by CPU 402 via memory 404. CPU 402 may include a single processing unit or processor or be distributed across one or more processing units or one or more processors in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems or a plurality of computer readable storage media in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to dynamically identify a danger zone for a predicted traffic accident and send a warning. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

In one embodiment, computer data storage unit 412 includes data repository 114 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to dynamically identifying a danger zone for a predicted traffic accident and sending a warning. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to dynamically identify a danger zone for a predicted traffic accident and send a warning. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of dynamically identifying a danger zone for a predicted traffic accident and sending a warning.

While it is understood that program code 414 for dynamically identifying a danger zone for a predicted traffic accident and sending a warning may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of dynamically identifying a danger zone for a predicted traffic accident and sending a warning. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
    capturing, by a camera included in a monitoring device at a first location, video images of traffic at a time $T_0$ and at a subsequent time $T_0+t$;
    sending, by the monitoring device, the captured video images to one or more processors of a danger zone identification and warning system;
    receiving, by the one or more processors and from the monitoring device, the video images;
    determining, by the one or more processors and using the video images, information about conditions of the traffic at the time $T_0$ and the subsequent time $T_0+t$, the information about the conditions of the traffic including speeds of a plurality of vehicles included in the traffic;
    determining, by the one or more processors, a greatest speed among the speeds of the plurality of vehicles included in the information about the conditions of the traffic;
    based on the greatest speed and a fixed distance from the first location, calculating, by the one or more processors, a response time $RT_0$;
    retrieving, by the one or more processors, past traffic accident data from a data repository;
    within the response time $RT_0$, employing, by the one or more processors, a dual artificial intelligence (AI) model that uses a shallow learner and a deep learner applied on the past traffic accident data;
    based on the employed dual AI model and the conditions of the traffic, predicting, by the one or more processors, that an accident is likely to occur in a zone towards which the traffic is moving, the accident involving one or more vehicles included in the plurality of vehicles, the one or more vehicles having respective one or more drivers, and the accident being predicted prior to the one or more vehicles traveling into the zone, wherein the predicting is based on the retrieved past traffic accident data and includes using data vectorization and using data transformation, wherein the using data vectorization includes transforming nominal values from the conditions of the traffic, the nominal values including a vehicle type, a vehicle color, a vehicle lock status, and a vehicle warning status for vehicles included in the plurality of vehicles, wherein the using data transformation includes transforming numerical values from the conditions of the traffic into an identical measurement unit, the numerical values including values for a vehicle age, a vehicle power, and a vehicle dynamics information for vehicles included in the plurality of vehicles, and wherein the vehicle dynamics information includes an average speed of a given vehicle included in the plurality of vehicles between the time $T_0$ and the time $T_0+t$ and a difference between a speed of the given vehicle at the time $T_0$ and another speed of the given vehicle at the time $T_0+t$;
    generating, by the one or more processors, a warning about the accident likely to occur in the zone;
    transmitting, by the one or more processors, the warning to a device on an object in the zone;
    re-transmitting, by the device on the object in the zone, the warning to one or more mobile devices being operated by one or more pedestrians within the zone and to one or more devices in the one or more vehicles; and
    in response to the re-transmitting and within the response time $RT_0$, presenting, by the one or more mobile devices being operated by the one or more pedestrians and the one or more devices in the one or more vehicles, the warning to the one or more drivers and to the one or more pedestrians, which provides the one or more drivers and the one or more pedestrians with an amount of time sufficient to take actions that avoid the accident or decrease negative effects of the accident.

2. The method of claim 1, further comprising:
    determining, by the one or more processors, that the response time $RT_0$ exceeds a threshold amount of time; and
    in response to the determining that the response time $RT_0$ exceeds the threshold amount of time, employing, by the one or more processors, the deep learner but not the shallow learner in a usage of the dual AI model in the predicting that the accident is likely to occur in the zone.

3. The method of claim 1, further comprising:
    determining, by the one or more processors, that the response time $RT_0$ does not exceed a threshold amount of time; and
    in response to the determining that the response time $RT_0$ does not exceed the threshold amount of time, employing, by the one or more processors, the shallow learner but not the deep learner in a usage of the dual AI model in the predicting that the accident is likely to occur in the zone.

4. The method of claim 1, further comprising:
    retrieving, by the one or more processors, a rule for determining whether a vehicle is engaging in a risky behavior likely to cause one or more types of accidents;
    generating, by the one or more processors, a first record of a snapshot of the traffic conditions at a particular time;
    based on the rule and the first record of the snapshot, determining, by the one or more processors, that a set of one or more vehicles specified in the first record of the snapshot are engaging in behaviors that are likely to cause the accident;

generating, by the one or more processors, a second record of the snapshot by masking the set of one or more vehicles to retain information about the set of one or more vehicles and filter out information about one or more other vehicles; and based on the rule and the second record, determining, by the one or more processors, that the masked set of one or more vehicles is likely to cause the accident, wherein the generating the warning and the re-transmitting the warning are based on the second record and further based on the determining that the masked set of one or more vehicles is likely to cause the accident.

5. The method of claim 1, further comprising:

determining, by the one or more processors, a type of the accident; and selecting, by the one or more processors, a format of the warning based on the type of the accident, wherein the format is an audio format, a visual format, or a tactile format.

6. The method of claim 1, further comprising the step of:

providing at least one support service for at least one of creating, integrating, hosting, maintaining, and deploying computer readable program code in the computer, the program code being executed by a processor of the computer to implement steps of receiving the video images, determining the information about the conditions of the traffic, determining the greatest speed, calculating the response time $RT_0$, retrieving the past traffic accident data, employing the dual AI model, predicting that the accident is likely to occur in the zone, generating the warning, and transmitting the warning.

7. A computer program product for dynamically identifying a danger zone for a predicted traffic accident, the computer program product comprising:

one or more computer readable storage media having computer readable program code collectively stored on the one or more computer readable storage media, the computer readable program code being executed by a central processing unit (CPU) of a computer system to cause the computer system to perform a method comprising:

the computer system receiving from a monitoring device video images of traffic at a time $T_0$ and at a subsequent time $T_0+t$, the video images being captured by a camera included in the monitoring device;

the computer system determining, by using the video images, information about conditions of the traffic at the time $T_0$ and the subsequent time $T_0+t$, the monitoring device being at a first location, and the traffic including a plurality of vehicles, the information about the conditions of the traffic including speeds of the plurality of vehicles;

the computer system determining a greatest speed among the speeds of the plurality of vehicles included in the information about the conditions of the traffic;

based on the greatest speed and a fixed distance from the first location, the computer system calculating a response time $RT_0$;

the computer system retrieving past traffic accident data from a data repository;

within the response time $RT_0$, the computer system employing a dual artificial intelligence (AI) model that uses a shallow learner and a deep learner applied on the past traffic accident data;

based on the employed dual AI model and the conditions of the traffic, the computer system predicting that an accident is likely to occur in a zone towards which the traffic is moving, the accident involving one or more vehicles included in the plurality of vehicles, the one or more vehicles having respective one or more drivers, and the accident being predicted prior to the one or more vehicles traveling into the zone, wherein the predicting is based on the retrieved past traffic accident data and includes using data vectorization and using data transformation, wherein the using data vectorization includes transforming nominal values from the conditions of the traffic, the nominal values including a vehicle type, a vehicle color, a vehicle lock status, and a vehicle warning status for vehicles included in the plurality of vehicles, wherein the using data transformation includes transforming numerical values from the conditions of the traffic into an identical measurement unit, the numerical values including values for a vehicle age, a vehicle power, and a vehicle dynamics information for vehicles included in the plurality of vehicles, and wherein the vehicle dynamics information includes an average speed of a given vehicle included in the plurality of vehicles between the time $T_0$ and the time $T_0+t$ and a difference between a speed of the given vehicle at the time $T_0$ and another speed of the given vehicle at the time $T_0+t$;

the computer system generating a warning about the accident likely to occur in the zone;

the computer system transmitting the warning to a device on an object in the zone;

the device on the object in the zone re-transmitting the warning to one or more mobile devices being operated by one or more pedestrians within the zone and to one or more devices in the one or more vehicles; and the one or more mobile devices and the one or more devices in the one or more vehicles presenting, in response to the re-transmitting and within the response time $RT_0$, the warning to the one or more drivers and to the one or more pedestrians, which provides the one or more drivers and the one or more pedestrians with an amount of time sufficient to take actions that avoid the accident or decrease negative effects of the accident.

8. The computer program product of claim 7, wherein the method further comprises:

the computer system determining that the response time $RT_0$ exceeds a threshold amount of time; and in response to the determining that the response time $RT_0$ exceeds the threshold amount of time, the computer system employing the deep learner but not the shallow learner in a usage of the dual AI model in the predicting that the accident is likely to occur in the zone.

9. The computer program product of claim 7, wherein the method further comprises:

the computer system determining that the response time $RT_0$ does not exceed a threshold amount of time; and in response to the determining that the response time $RT_0$ does not exceed the threshold amount of time, the computer system employing the shallow learner but not the deep learner in a usage of the dual AI model in the predicting that the accident is likely to occur in the zone.

10. The computer program product of claim 7, wherein the method further comprises:

the computer system retrieving a rule for determining whether a vehicle is engaging in a risky behavior likely to cause one or more types of accidents;

the computer system generating a first record of a snapshot of the traffic conditions at a particular time;

based on the rule and the first record of the snapshot, the computer system determining that a set of one or more vehicles specified in the first record of the snapshot are engaging in behaviors that are likely to cause the accident;

the computer system generating a second record of the snapshot by masking the set of one or more vehicles to retain information about the set of one or more vehicles and filter out information about one or more other vehicles; and based on the rule and the second record, the computer system determining that the masked set of one or more vehicles is likely to cause the accident, wherein the generating the warning and the re-transmitting the warning are based on the second record and further based on the determining that the masked set of one or more vehicles is likely to cause the accident.

11. The computer program product of claim 7, wherein the method further comprises:

the computer system determining a type of the accident; and the computer system selecting a format of the warning based on the type of the accident, wherein the format is an audio format, a visual format, or a tactile format.

12. A computer system comprising:

a monitoring device;

a camera included in the monitoring device;

one or more mobile devices;

one or more vehicle devices;

a re-transmission device;

a central processing unit (CPU);

a memory coupled to the CPU; and one or more computer readable storage media coupled to the CPU, the one or more computer readable storage media collectively containing instructions that are executed by the CPU via the memory to implement a method of dynamically identifying a danger zone for a predicted traffic accident, the method comprising:

the camera included in the monitoring device capturing video images of traffic at a time $T_0$ and at a subsequent time $T_0+t$, the monitoring device being at a first location;

using the video images, the computer system determining information about conditions of the traffic at the time $T_0$ and the subsequent time $T_0+t$, the information about the conditions of the traffic including speeds of a plurality of vehicles included in the traffic;

the computer system determining a greatest speed among the speeds of the plurality of vehicles included in the information about the conditions of the traffic;

based on the greatest speed and a fixed distance from the first location, the computer system calculating a response time $RT_0$;

the computer system retrieving past traffic accident data from a data repository;

within the response time $RT_0$, the computer system employing a dual artificial intelligence (AI) model that uses a shallow learner and a deep learner applied on the past traffic accident data;

based on the employed dual AI model and the conditions of the traffic, the computer system predicting that an accident is likely to occur in a zone towards which the traffic is moving, the accident involving one or more vehicles included in the plurality of vehicles, the one or more vehicles having respective one or more drivers, and the accident being predicted prior to the one or more vehicles traveling into the zone, wherein the predicting is based on the retrieved past traffic accident data and includes using data vectorization and using data transformation, wherein the using data vectorization includes transforming nominal values from the conditions of the traffic, the nominal values including a vehicle type, a vehicle color, a vehicle lock status, and a vehicle warning status for vehicles included in the plurality of vehicles, wherein the using data transformation includes transforming numerical values from the conditions of the traffic into an identical measurement unit, the numerical values including values for a vehicle age, a vehicle power, and a vehicle dynamics information for vehicles included in the plurality of vehicles, and wherein the vehicle dynamics information includes an average speed of a given vehicle included in the plurality of vehicles between the time $T_0$ and the time $T_0+t$ and a difference between a speed of the given vehicle at the time $T_0$ and another speed of the given vehicle at the time $T_0+t$;

the computer system generating a warning about the accident likely to occur in the zone;

the computer system transmitting the warning to the re-transmission device, which is a device on an object in the zone;

the re-transmission device re-transmitting the warning to the one or more mobile devices and to the one or more vehicle devices, wherein the one or more mobile devices are being operated by one or more pedestrians within the zone and the one or more vehicle devices are in the one or more vehicles; and the one or more mobile devices and the one or more vehicle devices presenting, in response to the re-transmitting and within the response time $RT_0$, the warning to the one or more pedestrians and to the one or more drivers, which provides the one or more pedestrians and the one or more drivers with an amount of time sufficient to take actions that avoid the accident or decrease negative effects of the accident.

13. The computer system of claim 12, wherein the method further comprises:

the computer system determining that the response time $RT_0$ exceeds a threshold amount of time; and in response to the determining that the response time $RT_0$ exceeds the threshold amount of time, the computer system employing the deep learner but not the shallow learner in a usage of the dual AI model in the predicting that the accident is likely to occur in the zone.

14. The computer system of claim 12, wherein the method further comprises:

the computer system determining that the response time $RT_0$ does not exceed a threshold amount of time; and in response to the determining that the response time $RT_0$ does not exceed the threshold amount of time, the computer system employing the shallow learner but not the deep learner in a usage of the dual AI model in the predicting that the accident is likely to occur in the zone.

15. The computer system of claim 12, wherein the method further comprises:
- the computer system retrieving a rule for determining whether a vehicle is engaging in a risky behavior likely to cause one or more types of accidents;
- the computer system generating a first record of a snapshot of the traffic conditions at a particular time;
- based on the rule and the first record of the snapshot, the computer system determining that a set of one or more vehicles specified in the first record of the snapshot are engaging in behaviors that are likely to cause the accident;
- the computer system generating a second record of the snapshot by masking the set of one or more vehicles to retain information about the set of one or more vehicles and filter out information about one or more other vehicles; and
- based on the rule and the second record, the computer system determining that the masked set of one or more vehicles is likely to cause the accident,
- wherein the generating the warning and the re-transmitting the warning are based on the second record and further based on the determining that the masked set of one or more vehicles is likely to cause the accident.

16. The computer system of claim 12, wherein the method further comprises:
- the computer system determining a type of the accident; and
- the computer system selecting a format of the warning based on the type of the accident, wherein the format is an audio format, a visual format, or a tactile format.

\* \* \* \* \*